(No Model.)
J. B. & W. M. BRIMER.
ELEVATOR.
No. 277,212. Patented May 8, 1883.
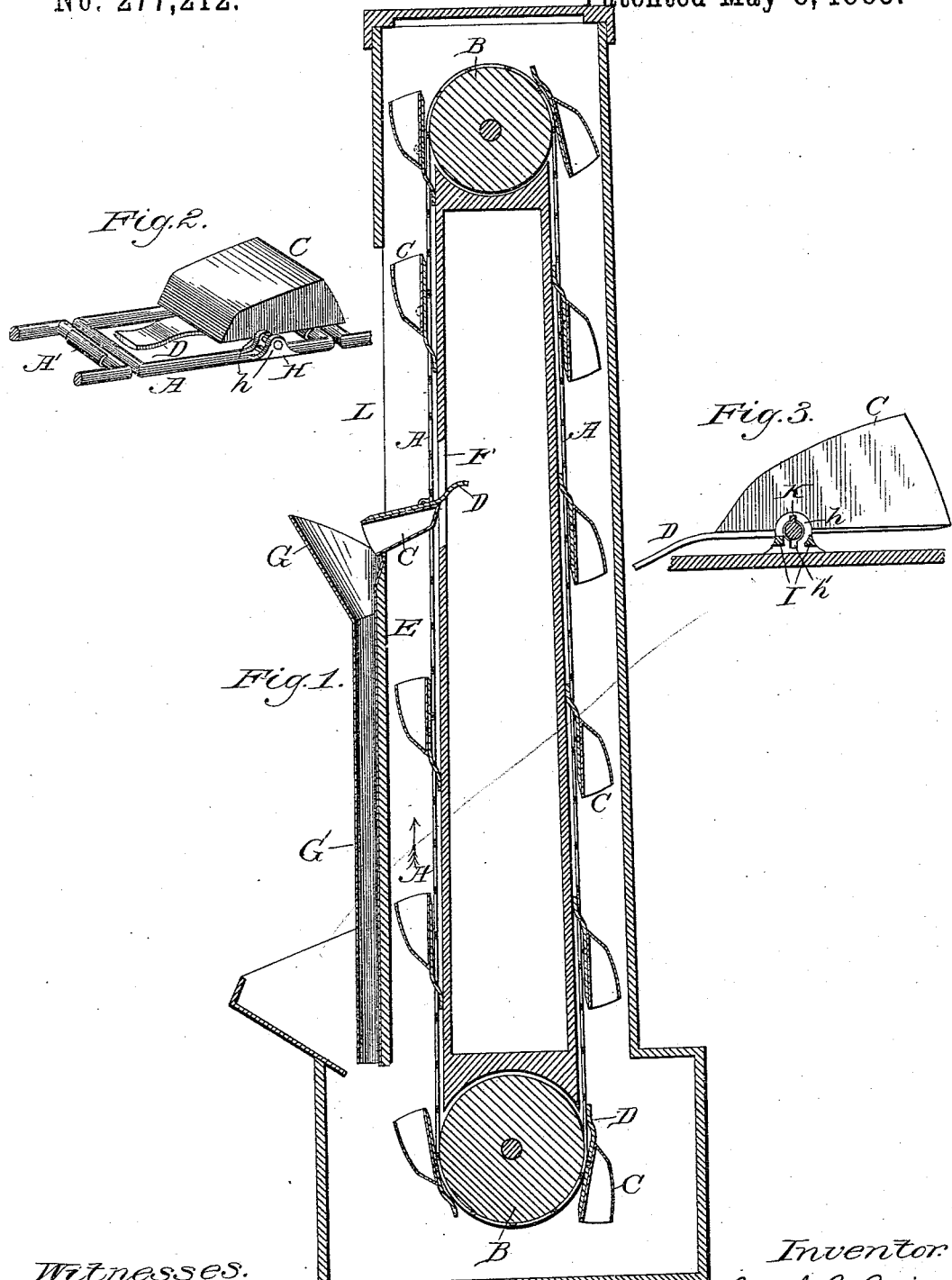

UNITED STATES PATENT OFFICE.

JACOB B. BRIMER AND WILLIAM M. BRIMER, OF RICHLAND CENTRE, WIS.

ELEVATOR.

SPECIFICATION forming part of Letters Patent No. 277,212, dated May 8, 1883.

Application filed March 30, 1883. (No model.)

*To all whom it may concern:*

Be it known that we, JACOB B. BRIMER and WILLIAM M. BRIMER, both citizens of the United States, and residing in Richland Centre, in Richland county, and State of Wisconsin, have invented certain new and useful Improvements in Elevators, of which the following is a specification.

This invention relates more particularly to conveyers or elevators for conducting and conveying grain to various parts of a mill or warehouse, but is also adapted to be employed for raising earth or liquids.

The principal objects of our invention are to provide an elevator comprising a series of buckets or carriers hinged or pivoted to an endless chain or belt, in which the buckets can be caused to automatically tip and discharge their contents at any desired point along their line of travel—as, for example, in any one of the several stories of a building in which the elevator may be located.

A further object is to provide means of automatically righting the buckets after they have been tipped, and for holding the buckets in such position until it again becomes necessary to tip them.

A further object is to provide certain improved details of construction, all as hereinafter described, and illustrated in the annexed drawings, in which—

Figure 1 represents in vertical section an elevator or conveyer constructed in accordance with our invention. Fig. 2 is a detail showing in perspective one of the buckets and a portion of the chain to which it is pivoted. Fig. 3 is a section taken through the bearing at one side of the bucket shown in Fig. 2.

Referring by letter to the annexed drawings, in which like letters denote like parts, A indicates an endless belt or chain arranged to travel over drums or sprocket-wheels B, and provided at intervals upon its face with the tilting carrier-buckets C. These buckets are attached to the chain in such a manner that they can be either swung back and held against the chain, so as to prevent their contents from spilling or be tipped and swung out laterally in order to discharge the same. As a means for bringing and holding the buckets in position for receiving and carrying the grain, liquids, or other articles to be conveyed or elevated, and also for automatically effecting the tipping of the buckets at such point or points along their line of travel as a discharge of their contents may be required, each bucket is provided with an arm or tail, D, which, while the loaded bucket is being carried through a chute, bears against and rides over a stationary bearing-surface, which will thus prevent the bucket from tipping. When, however, the arms upon the buckets arrive at a break or opening in this bearing the buckets will be free to tip, and hence will be tilted down by gravity, so as to discharge their contents as they successively arrive at such opening.

In the annexed drawings we have shown the chain and buckets arranged to travel through a chute, E, which, for example, can be extended from the lower to the upper portion of a building, so as to pass through the several stories thereof.

The arm D of each bucket, which is in the nature of a lever or trigger, projects downwardly, and is curved rearwardly from the bucket, so that while the buckets are traveling along the chute these bent arms shall bear upon one of the sides of the latter, and hence hold the buckets which are being carried upward in an upright position. It will be seen, however, that when the arm arrives at a trap or opening, F, in the chute, the bucket will be free to turn upon its pivotal bearings, and hence will tip down and discharge its contents into a suitable hopper, G, or other receptacle provided for receiving the article carried by the buckets.

Where the elevator is employed in a mill or other building, an opening, F, in the chute can be provided for each story, and a suitable door arranged for each opening, so that by opening any one of the doors the material brought from below can be elevated to and automatically discharged at any required height. As soon as the bucket passes the opening at which it has been tilted its arm D, coming in contact with the side of the chute, will be pushed toward the chain or belt, and hence again right the bucket, in which position the latter will be held so long as its arm rides over a bearing-surface in suitable proximity to the endless chain.

The chain herein shown is composed of rectangular links connected together by bent tongues A', and provided upon their sides with bearings H for the pivots of the buckets. In such case, the arms D, projecting from the bottom portions of the buckets, are free to vibrate between the sides of the links, so that the weight of the buckets will throw their arms back against the wall of the chute. It will be obvious, however, that endless chains of other construction could be employed, or that the buckets could be pivoted upon an endless belt provided with slots for the passage of their arms; or, in lieu of a chain or belt, two parallel chains could be employed, the buckets in such case being pivoted to both chains or to connections between the two.

In order to efficiently limit the extent of the vibration of each bucket, we form the bearings H with two walls, $h$, through which the pivots of the buckets pass, and between said walls provide stops I, against which a lug, K, upon the pivot will strike at the proper moment. In such instance we form through one or both walls of the bearing a slot, $h'$, which runs into the opening for the pivot through said walls, so that the lug can pass through said slot when the pivot is inserted in the bearing; but it will be evident that the pivots could be fixed and the buckets arranged to turn upon the pivots—as, for example, the buckets could be arranged to turn upon rods secured at their ends to the sides of the links.

In the annexed illustration a vertical chute or passage is shown provided with a central double-walled longitudinal partition. The opening F, at which the buckets are tripped, is formed in this partition, and opposite said opening is an opening, L, below which the hopper is located. A spout, G', runs from this hopper to the lower portion of the chute, whereby grain from the base of the latter can be raised, thrown out into the spout and allowed to run back. It will be understood, however, that this arrangement is made with a view of illustrating the principle of our invention, and that we do not confine ourselves to any particular arrangement of chute, hopper, or spouts, or to any specific number of openings F. The endless belt or chain can be arranged to travel in an inclined or a horizontal plane, if desired, and any suitable means provided for receiving the contents of the buckets.

One or more arms could be arranged to extend from the sides of the buckets instead of from the bottom thereof, the principle of operation being, however, the same in each case. As shown, the arm is at one side of the center of gravity of the bucket, and hence a slight tip forward of the latter will hold the arm against the chute. For heavy buckets we prefer providing the arms D with anti-friction rollers which shall run upon the wall of the chute so as to reduce friction.

It will be seen that while an elevator of the construction hereinbefore described is especially applicable for raising grain, it can also be employed for raising liquids or for lifting earth in dredging or excavating machines.

Having thus described our invention, what we claim, and desire to secure by Letters Patent, is—

1. An elevator in which the buckets or carriers are automatically operated to discharge their contents at various points along their line of travel, substantially as described.

2. The combination, in an elevator, of the buckets pivotally secured upon an endless belt or chain, with means, substantially as described, for tripping and righting the buckets at such points along their line as it is desired to discharge their contents.

3. The combination, with a chute provided with traps, of the pivoted elevator-bucket provided with an arm or lever secured to the bucket at a line at one side of its center of gravity and having a bearing upon the chute, in which said traps for tripping the arm are located, substantially as described.

4. The combination, with a chute provided in one of its sides with doors, of an endless belt or chain carrying pivoted buckets, each provided with an arm or lever, said arms being adapted to maintain the buckets in position for holding their contents, substantially in the manner described, and the doors, when open, being arranged to constitute traps for tripping the arms so as to allow the buckets to tilt and discharge their contents, as set forth.

5. A pivoted elevator-bucket provided with a pivot having a projecting lug, in combination with a bearing upon the endless belt or chain, and stops against which the said lug is adapted to strike in order to limit the extent of vibration of the bucket, substantially as described.

6. The combination of the endless belt or chain with the swinging elevator-bucket provided with a pivot having a projecting lug, the double-walled slotted bearings H, and the stops L, said members being constructed and arranged substantially as and for the purpose described.

JACOB B. BRIMER.
WILLIAM M. BRIMER.

Witnesses:
J. H. KINNY,
WILLIAM WEELFING.